United States Patent
Koren et al.

[11] Patent Number: 5,631,989
[45] Date of Patent: May 20, 1997

[54] FIBER AND ACTIVE OPTICAL DEVICE INTERCONNECTION ASSEMBLY

[75] Inventors: Uziel Koren, Fair Haven, N.J.; Henry H. Yaffe, Dunwoody; Norman R. Lampert, Norcross, both of Ga.

[73] Assignee: Lucent Technologies Inc., Murray Hill, N.J.

[21] Appl. No.: 561,676

[22] Filed: Nov. 22, 1995

[51] Int. Cl.$^6$ .................................................. G02B 6/42
[52] U.S. Cl. ................... 385/91; 385/88; 385/90
[58] Field of Search ............................ 385/88–94

[56] References Cited

U.S. PATENT DOCUMENTS

| | | | |
|---|---|---|---|
| 4,130,343 | 12/1978 | Miller et al. | 385/49 |
| 4,296,997 | 10/1981 | Malsot et al. | 385/77 |
| 4,729,623 | 3/1988 | Mery | 385/91 |
| 4,856,866 | 8/1989 | Freeman et al. | 385/72 |
| 4,915,472 | 4/1990 | Liu | 385/55 |
| 5,082,345 | 1/1992 | Cammons et al. | 385/60 |

Primary Examiner—John D. Lee

[57] ABSTRACT

A connector assembly for coupling an optical fiber to an active optical device has a metal sleeve and an L-shaped alignment block having perpendicularly disposed reference surfaces. A resilient member on the sleeve biases an optical fiber terminating plug against the reference surfaces. The active optical device is attached to a ceramic sub-mount and the sub-mount is placed on one of the reference surfaces. The sub-mount is sized so that an optical port for the active optical device will become aligned with the central axis of the plug. To couple the optical fiber with the active optical device, the plug is slid into contact with the active optical device and is rotated until the fiber is substantially registered with the optical port. The sleeve may have a second resilient member for receiving another plug from the opposite end of the sleeve with a fiber in the other plug being coupled to a second optical port. The active optical device can comprise a variety of devices, such as a laser or an optical modulator with mode field beam expanders.

18 Claims, 6 Drawing Sheets

FIBER AND ACTIVE OPTICAL DEVICE INTERCONNECTION ASSEMBLY

FIELD OF THE INVENTION

This invention relates to a fiber interconnection assembly and, more particularly to an assembly for connecting an optical fiber to an active optical device.

BACKGROUND OF THE INVENTION

As is well known, an optical fiber has many advantages over an electrical conductor, such as the optical fiber's wide bandwidth, its high immunity to electromagnetic radiation, and its ability to conduct signals with very low levels of signal loss. Because of these and other advantages of the optical fiber and of optical communication in general, optical fibers are rapidly replacing electrical conductors in many communication systems.

The application of optical fiber-to-the-home (FTTH), however, has been rather slow. An impediment to a FTTH architecture is the cost of the optical unit at the home. In particular, providing the customer with an optical link upstream in the network. Such a link would require connecting an optical fiber to an active optical device, such as a modulator or laser. The active optical device of a modulator or laser would be necessary in a home in order to provide the home with the capability of transmitting optical signals that have been encoded with information from the home.

Presently, the coupling of an optical fiber to an active optical device is a relatively expensive and complicated process. During the packaging of the active optical device, an optical fiber is precisely aligned therewith and is glued and/or bonded in position. The active optical device is thereafter sold, purchased, or used with the fiber permanently attached thereto. The alignment and attachment of the fiber to the active optical device presents an additional process and cost in the production thereof.

By contrast, the communication industry has devoted much attention to the splicing of two fibers together and, as a result, has developed many suitable types of devices or assemblies for accomplishing such coupling or splicing with good reliability and low cost. For instance, one relative low cost and high reliable assembly is disclosed in U.S. Pat. No. 4,915,472 of Liu, which is hereby incorporated by reference. This assembly is commonly referred to as an L-block rotary splice and receives fiber plugs between a sleeve and an L-shaped alignment block. The optical fibers are positioned to be slightly eccentric relative to the central axis of the plugs so that the fibers may be brought into registration with each other by simply rotating one or both of the plugs to the position of maximum signal transmission. The L-block rotary splice provides a relatively simple assembly for mechanically splicing two fibers together.

SUMMARY OF THE INVENTION

The present invention, in a preferred embodiment thereof, is an assembly for coupling an optical fiber to an active optical device that has been placed on a sub-mount. The coupling assembly comprises an alignment block having first and second reference surfaces disposed approximately at right angles to each other and a sleeve for receiving the alignment block. The sleeve has a resilient member disposed at an angle to both the first and second reference surfaces and is for biasing a fiber-containing plug against the first and second reference surfaces. The sub-mount is placed on one of the reference surfaces and is sized so that an optical port of the active optical device on the sub-mount is aligned with the central axis of the plug when it is forced against the first and second reference surfaces. The plug is formed so that an optical fiber extends through a bore formed approximately along the plug's central axis. In order to couple the fiber to the active optical device, the plug is slid along the alignment block so that an end face of the plug nearly contacts the active optical device and then the plug is rotated until the optical fiber becomes substantially aligned with the active optical device's optical port.

In the preferred embodiment, the sleeve is formed from a single piece of resilient sheet metal and the alignment block is an L-shaped glass block. The sleeve may additionally have a second resilient member for receiving a second plug from the other end of the sleeve. The second plug is slid along the sleeve into near contact with the other end of the active optical device and is rotated until an optical fiber within the plug becomes substantially aligned with a second optical port in the active optical device. The active optical device received within a connector according to the invention can therefore comprise a variety of devices, such as a laser having one or two optical ports or an optical modulator having two optical ports.

In a method according to the invention, the alignment block is placed within the sleeve and then the plug is inserted between the resilient member and the reference surfaces of the alignment block. The sub-mount with the active optical device is placed on one of the reference surfaces and has been sized so that an optical port of the active optical device is aligned with the central axis of the plug. The optical fiber is coupled to the optical port of the active optical device by sliding and rotating the plug.

In the method for coupling the optical fiber to the active optical device, the active optical device is secured to the alignment block with a UV curable epoxy, for example. Also, the plug is inserted into the sleeve by separating the resilient member from the alignment block, thereby providing sufficient space for the entry of the plug.

The connector assembly according to the invention is a low cost assembly for coupling an active optical device to an optical fiber. The optical fiber can be coupled to the active optical device in a simple process and in a non-permanent manner. Further, the assembly should be very reliable in view of the high level of reliability for the existing L-block rotary splice, which is for coupling two optical fibers to each other.

The principles and features of the present invention will be more readily apparent and understood from the following detailed description, read in conjunction with the accompanying drawings.

DETAILED DESCRIPTION

Figure 1:
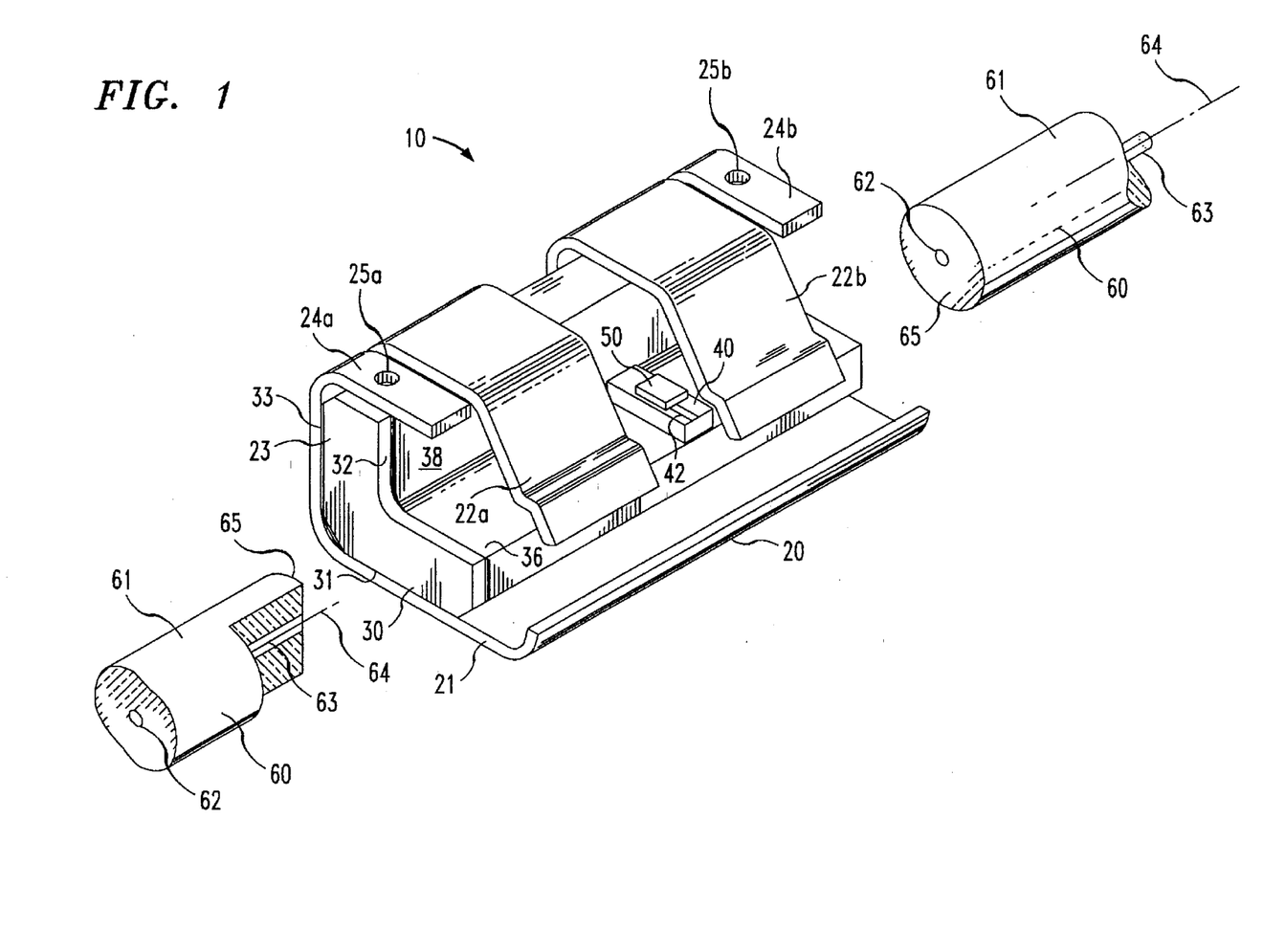
FIG. 1 is front perspective view of a fiber interconnection assembly according to a preferred embodiment.

With reference to FIG. 1, a connector assembly 10 for joining one or more optical fibers to an active optical device comprises a tubular sleeve 20. The sleeve 20 is formed from a single piece of resilient sheet metal which is preferably a beryllium-copper and has a generally planar bottom 21, an upstanding rear wall 23, two resilient fingers 22a and 22b that form a bifurcated spring, and two resilient tabs 24a and 24b. The resilient tabs 24a and 24b respectively have dimples 25a and 25b and protrusions (not shown) in corresponding locations on the underside of the tabs 25a and 25b.

The fingers 22a and 22b are respectively spaced from the tabs 24a and 24b by small slits formed in the sleeve 20 and are also spaced from each other by a relatively large opening which extends completely across the top of the sleeve 20 and, as shown in the figure, down the rear wall 23 of the sleeve 20. The amount of distance in which the opening projects down the rear wall 23 is not critical to the invention and may comprise any suitable distance. The fingers 22a and 22b project down from the top of the sleeve 20 at an angle away from the rear wall 23 of the sleeve 20.

Figure 2A:
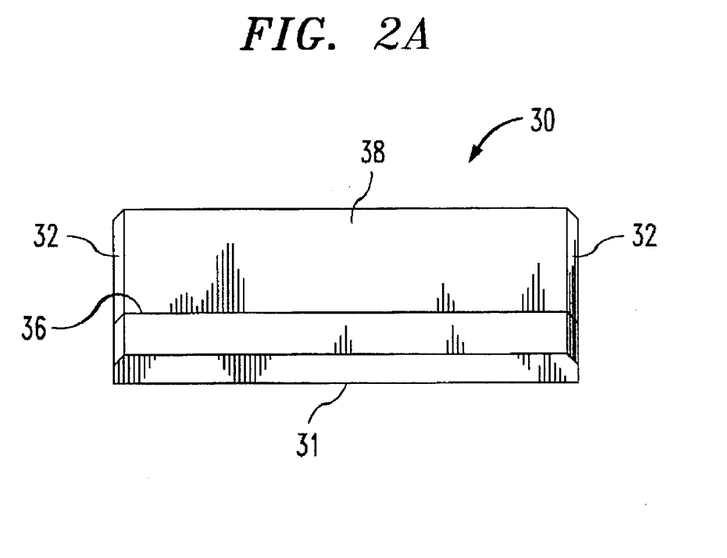
FIGS. 2(A) and (B) are respectively front and side elevations of an L-shaped alignment block shown in FIG. 1.
Figure 2B:
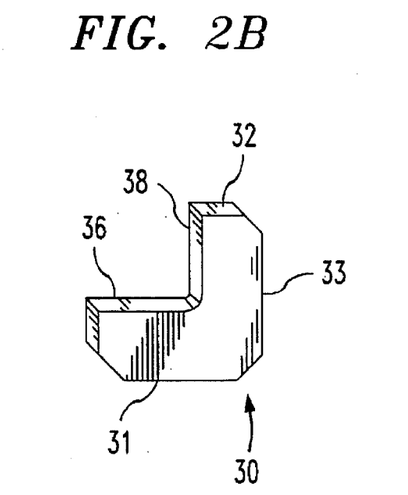

The connector assembly 10 also comprises an L-shaped alignment block 30, which is shown is greater detail in FIGS. 2(A) and (B). The alignment block 30 has a planar base 31 for resting upon the bottom 21 of the sleeve 20 and a rear segment 33 for abutting against the rear wall 23 of the sleeve 20. The block 30 has bevels 32 formed at either end and has planar reference surfaces 36 and 38 which are formed at right angles to each other. The alignment block 30 may be made of any dimensionally stable material, and is preferably made of Pyrex® or other suitable glass-type material.

When the alignment block 30 is inserted into the sleeve 20, the resilient tabs 24a and 24b are stressed to exert a force clamping the alignment block 30 within the sleeve 20. The alignment block 30 is thereafter maintained in a fixed position between the protrusions on the underside of the tabs 24a and 24b and the bottom 21 of the sleeve 20.

After the alignment block 30 has been installed within the sleeve 20, at least one optical fiber terminating plug 60 is received within the sleeve 20. The plug 60 is inserted into the sleeve 20 with the aid of a tool for separating the fingers 22a and 22b from the bottom wall 21 of the sleeve 20. The details of this insertion process and of the tool may be found within U.S. Pat. No. 4,915,472, of Liu, which has been incorporated by reference.

Each optical fiber terminating plug 60 comprises a glass cylinder 61 having a longitudinally extending bore 62 for receiving an optical fiber 63. The fiber 63 terminates and is flush with the end face or facet 65 of the plug 60. The bore 62 and fiber 63 are likely to be eccentric relative to the central axis of the plug 60 so as to be radially displaced by a small amount from the axis 64 of the cylinder 61.

Once the plugs 60 have been inserted into the sleeve 20, the fingers 22a and 22b of the sleeve 20 exert a force on the plugs 60 forcing them against the reference surfaces 36 and 38. The force exerted by the fingers 22a and 22b aligns the plugs 60 within the sleeve 20 such that the plug axes become and remain co-parallel with each other. These forces serve to retain the plugs 60 within the sleeve 20 yet are moderate enough to permit the plugs 60 to be rotated about their respective axes while remaining co-parallel and in contact with reference surfaces 36 and 38.

An active optical device 50, which is preferably mounted onto a ceramic sub-mount 40, is then centered on the reference surface 36 of the alignment block 30 between the two plugs 60. The active optical device 50 may comprise any type of active optical device, such as an electro-optical modulator or a laser diode and preferably is designed and fabricated with an internal optical-mode field taper to minimize the amount of coupling loss from the single mode fibers 63 to the active optical device 50. The height of the ceramic sub-mount 40 and of the element 50 are chosen so that the input or output port of the active optical device 50 is aligned with the central axes of the plugs 60.

After the active optical device 50 has been positioned on the reference surface 36, the plugs 60 are then carefully slid along the sleeve 20 into engagement with the active optical device 50. As is will be apparent to those skilled in the art, by rotating the plugs 60 within the sleeve 20 the free ends of the fibers 63 can be brought into registration with the active optical device 50 thereby to align the active optical device 50 to both fibers. Once the active optical device 50 is aligned, the sub-mount 40 is glued in place with a UV curable adhesive.

Figure 3:
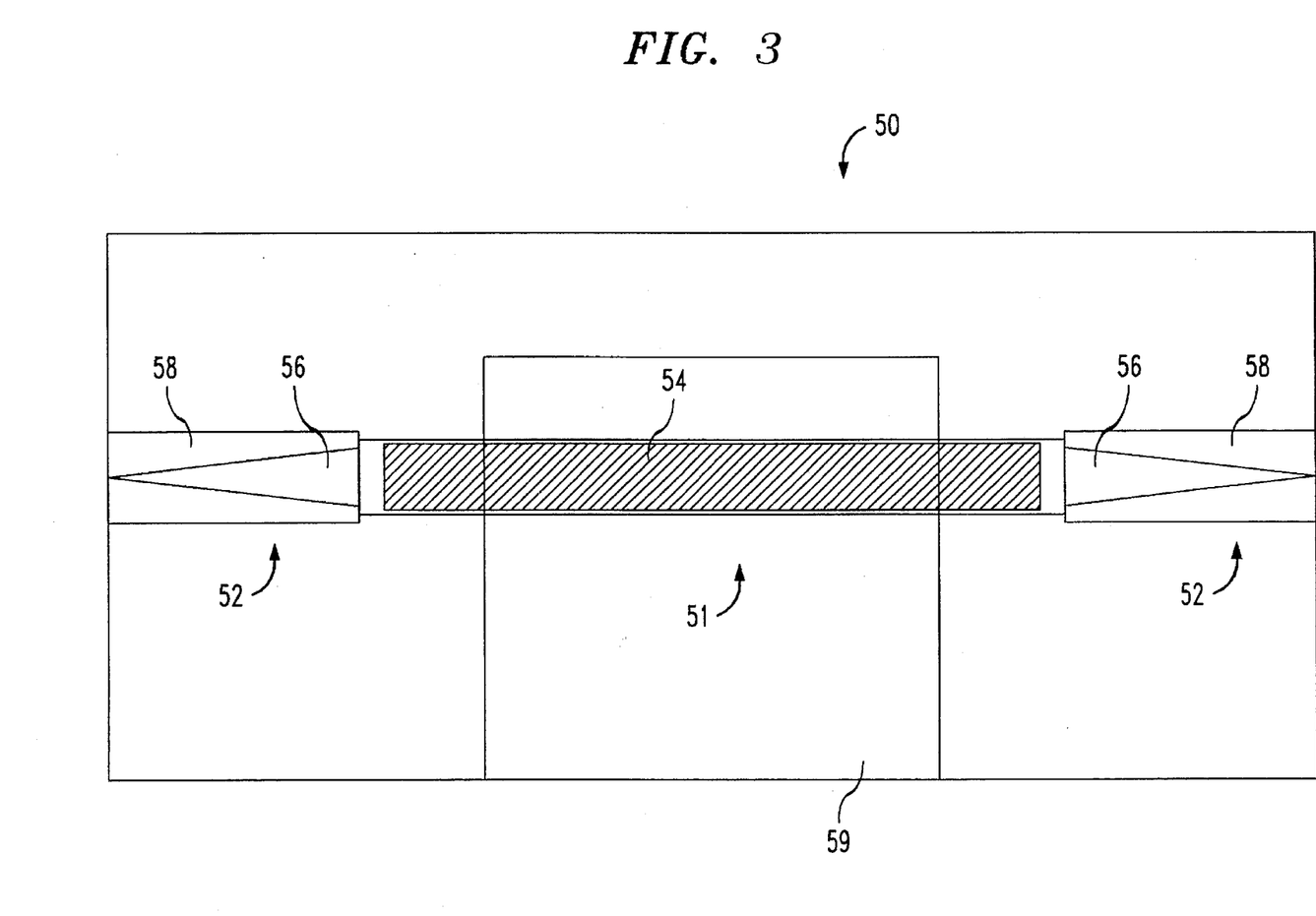
FIG. 3 is a diagrammatic view of an electro-absorption modulator mounted in the device of FIG. 1.

An example of an active optical device 50 that can be coupled to optical fibers 63 within the connector assembly 10 of the invention is shown in FIG. 3. The active optical device 50 is an electro-absorption modulator 50 that has been described in the October 1994 issue of Electronics Letters in an article entitled "Electro-absorption Modulators With Passive Waveguide Spot-Size Converters," of which two of the inventors are co-authors.

While the electro-absorption modulator 50 does not form part of the present invention and is fully described in the above-referenced article, a brief description of the relevant modulator 50 properties will be given in order to assist in the understanding of the invention. The electro-absorption modulator 50 comprises a 270 mm long active modulator region 51 and two 300 mm long passive beam expander regions 52. The beam expander regions 52 provide a gradual transition from a tightly confined 1.3/1.1 quaternary waveguide to a loosely confined thin 1.1 quaternary waveguide with a large size optical mode.

The modulator 50 is driven with an electrode 59 which is coupled to a strip transmission line 42 printed on the ceramic sub-mount 40, which are shown in FIG. 1. The ceramic sub-mount 40 may be connected to a suitable RF signal source (not shown) for driving the modulator 50. For instance, the entire connector assembly 10 may be affixed within a mounting enclosure which has a RF connector and leads for routing the RF signals to the transmission line 42 on the ceramic sub-mount 40.

Figure 4:
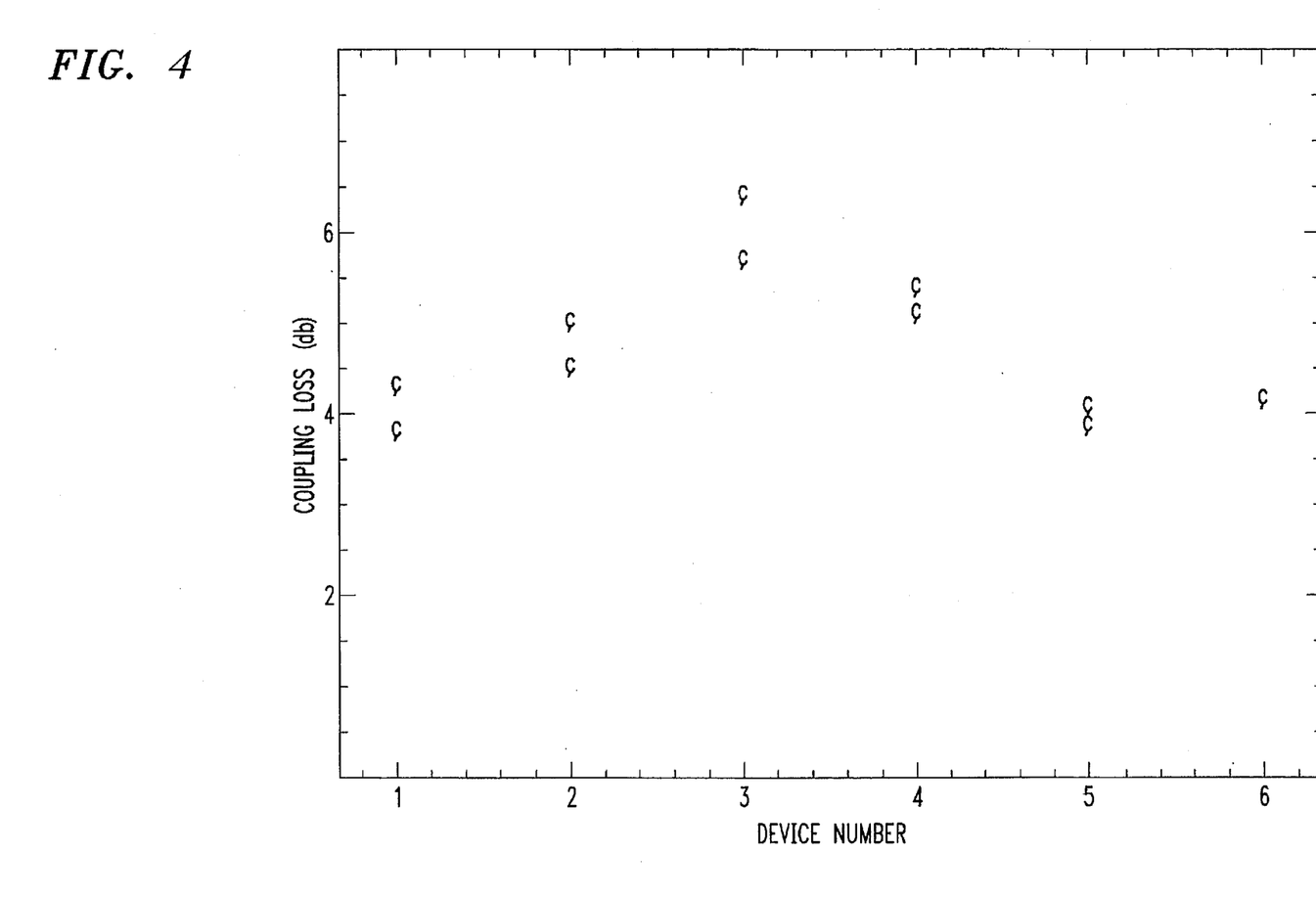
FIG. 4 is a graph of coupling loss to a flat fiber for the electro-absorption modulator of FIG. 3.

It has been determined that the electro-absorption modulator 50 having such a waveguide taper can be aligned to the cleaved fibers with alignment tolerances of about ±3 μm for 1 dB excess loss. A statistical distribution of input coupling efficiency per facet measured on two facets for six different devices without facet coatings is shown in FIG. 4. Accounting for reflection at the facets, average coupling and transition losses were only about 3.5 dB per facet. The connector assembly 10 therefore provides an efficient coupling to the modulator 50.

Figure 5A:
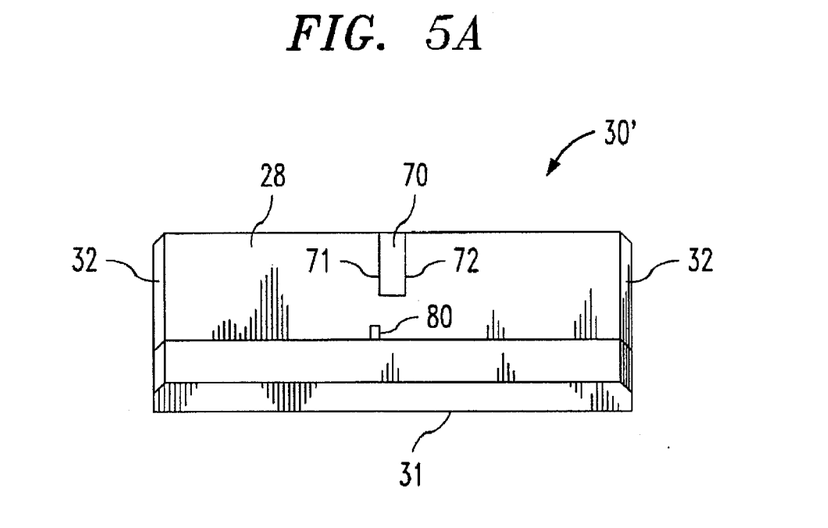
FIGS. 5(A) and (B) are front and side elevations of a second embodiment of an L-shaped alignment block.
Figure 5B:
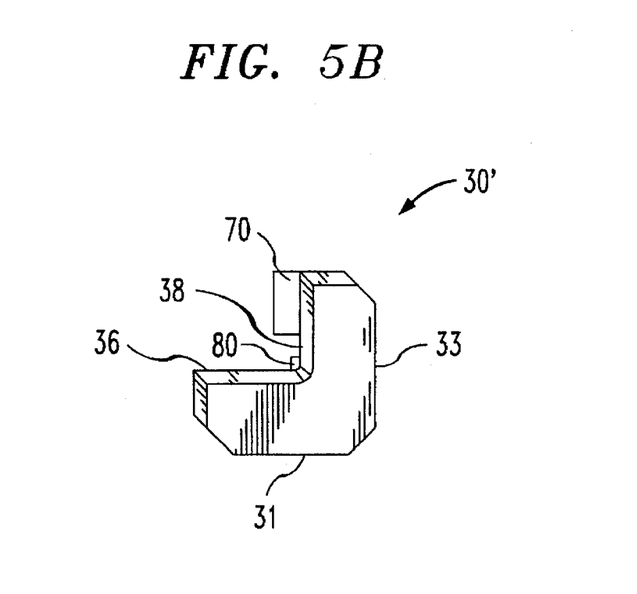

A second embodiment of an alignment block 30' is shown in FIGS. 5(A) and (B). When the plugs 60 are coupled and aligned to the active optical device 50, the plugs 60 should only be moved a distance sufficient to couple the fibers 63 to the active optical device 50. If the plugs 60 are moved past this distance, the active optical device 50 may become damaged by the plugs 60.

To limit the distance that the plugs 60 are able to travel within the sleeve 20, the alignment block 30' advantageously has a stop 70 for engaging the plugs 60 after the fibers 63 have become coupled to the active optical device 50. Therefore, the edges 71 of the stop 70 should be aligned with the edge of the optical port within the active optical device 50. In the example of the electro-absorption modulator 50, the edges 71 of the stop 70 would be aligned with the edges of the beam expanders 52.

The stop 70 may an integral member of the alignment block 30' or it may be attached as a separate element. The amount of distance in which the stop 70 protrudes from the reference surface 38 is not critical to the invention so long as the stop 70 is able to contact the plugs 60. Further, the stop 70 may be placed in locations other than on the reference surface 38, may be formed integral with the ceramic sub-mount 40, or may be located above, below, or even on either side of the active optical device 50. If the stop 70 is fabricated during the fabrication of the ceramic sub-mount 40 and the active optical device 50, it can be precisely sized relative to the size of the active optical device 50. Other variations in the stop 70 will be apparent to those skilled in the art upon reading this description.

As shown in FIG. 5(A), the alignment block 30' according to the second embodiment of the invention may additionally have a tab or other type of protrusion 80 on one of the reference surfaces 36 or 38. An edge of the tab 80 is aligned with one of the edges 71 of the stop 70 so that when the sub-mount 40 is placed into an abutting relationship with the tab 80 the sub-mount 40 is also positioned correctly relative to the plugs 60. The tab 80 must be fairly small so as to not stop the plugs 60 before they contact the stop 70. Although not shown, additional tabs may be formed on the reference surfaces 36 and 38 to further assist in the placement of the sub-mount 40.

Figure 6:
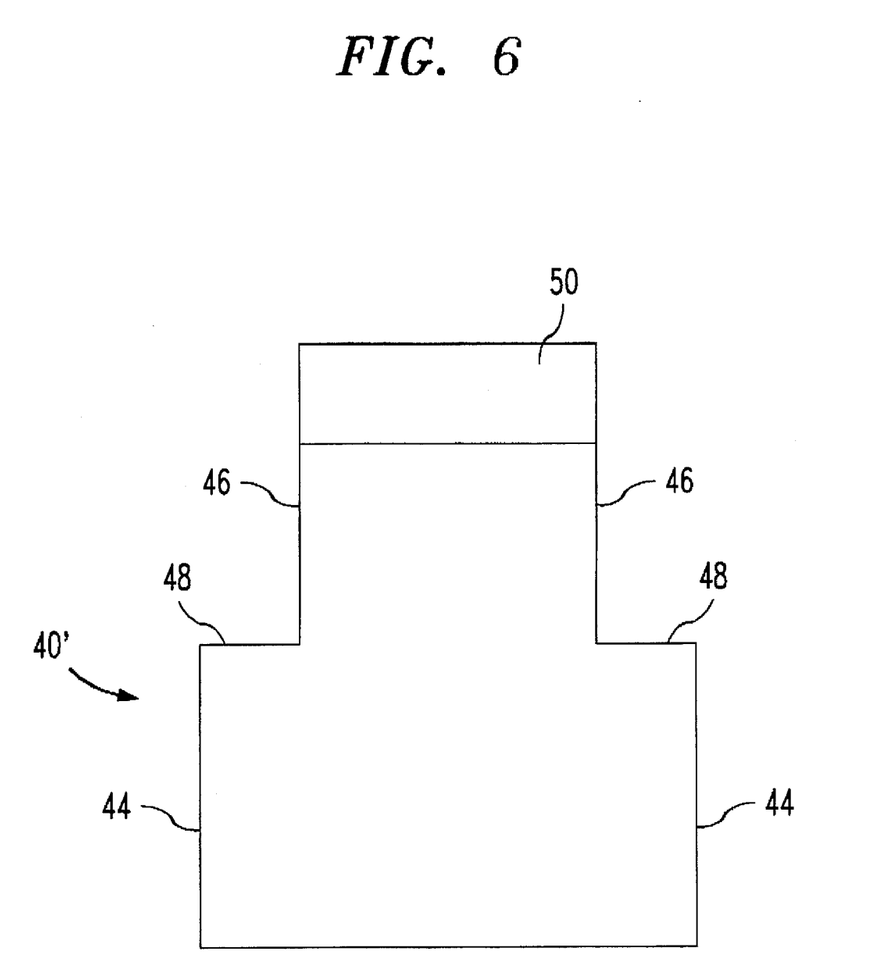
FIG. 6 is a side view of a second embodiment of a sub-mount for an active optical device.

A front view of a sub-mount 40' according to a second embodiment of the invention is shown in FIG. 6. The sub-mount 40' has a pair of planar side surfaces 44 and a second pair of planar side surfaces 46 which are recessed from surfaces 44. An active optical device 50 is mounted on top of the sub-mount 40'. The pair of planar surfaces 44 engage the plugs 60 and prevent the plugs 60 from contacting the active optical device 50. The planar side surfaces 44 and 46 are joined together by a step or ledge portion 48. It should be understood, however, that the active optical device 50 can be spaced from the plugs 60 in any suitable manner.

With a connector assembly 10 according to the invention, an active optical device can be coupled to an optical fiber with very low coupling losses, which can be further reduced with the use of an optical-mode field taper. Significantly, these low coupling losses are obtained while simplifying the manner in which a fiber is coupled to an active optical device. The connector assembly 10 is a low cost connector which is very suitable for many applications, such as those that include a fiber-to-the-home architecture.

Furthermore, the connector assembly 10 should be highly reliable in view of the high level of reliability of the L-block rotary splice which has been successfully used in the field for many years.

The foregoing has been illustrative of the features and principles of the present invention. Various changes or modifications to the invention may be apparent to workers in the art without departure from the spirit and scope thereof.

We claim:

1. An assembly for coupling an optical fiber to an active optical device formed on a sub-mount, comprising:

an alignment block having first and second reference surfaces disposed at an angle to each other, said sub-mount attaching to one of said reference surfaces; and a sleeve for receiving said alignment block and having a resilient member disposed at an angle to said first and second reference surfaces for biasing a plug against said first and second reference surfaces and for aligning a central axis of said plug with an optical port of said active optical device, said sleeve having an aperture for receiving said sub-mount and said optical fiber extending through a bore formed approximately along said central axis of said plug.

2. The coupling assembly as set forth in claim 1, wherein said first and second reference surfaces are perpendicular to each other.

3. The coupling assembly as set forth in claim 1, wherein said sleeve further comprises means for securely holding said alignment block.

4. The coupling assembly as set forth in claim 1, wherein said active optical device comprises a laser.

5. The coupling assembly as set forth in claim 1, wherein said sleeve further comprises a second resilient member on an opposite side of said aperture as the first resilient member, said second resilient member for biasing a second plug against said first and second reference surfaces and for aligning a central axis of said second plug with a second optical port of said active optical device.

6. The coupling assembly as set forth in claim 5, wherein said active optical device comprises an optical modulator for receiving light from an optical fiber within one of the two plugs, for modulating said light, and for passing said modulated light into an optical fiber in the other of the two plugs.

7. The coupling assembly as set forth in claim 1, wherein said sub-mount comprises a ceramic sub-mount for positioning said optical port of said active optical device in alignment with said central axis of said plug.

8. The coupling assembly as set forth in claim 1, further comprising a beam expander integrated with said active optical device for coupling light between said active optical device and said optical fiber.

9. The coupling assembly as set forth in claim 1, further comprising a stop for preventing said plug from being slid past an edge of said active optical device.

10. The coupling assembly as set forth in claim 9, wherein said stop is positioned on one of said first or second reference surfaces.

11. The coupling assembly as set forth in claim 1, wherein said sleeve comprises a single piece of resilient sheet metal.

12. The coupling assembly as set forth in claim 1, wherein said alignment block comprises glass.

13. The coupling assembly as set forth in claim 1, wherein said sub-mount comprises a side surface for contacting said plug and for spacing said plug from said active optical device.

14. A method of coupling an optical fiber to an active optical device formed on a sub-mount, comprising the steps of:

placing an alignment block within a sleeve, said alignment block having first and second reference surfaces disposed at an angle to each other;

inserting a plug within said sleeve so that said plug contacts said first and second reference surfaces and also contacts a resilient member of said sleeve, said resilient member biasing said plug against said first and second reference surfaces;

securing said sub-mount having said active optical device onto one of said first or second surfaces of said alignment block, said sub-mount being sized so that an optical port of said active optical device is aligned with a central axis of said plug; and sliding said plug along said alignment block within said sleeve so that an end face of said plug is adjacent said active optical device, said optical fiber extending through a bore formed approximately along said central axis of said plug.

15. The method as set forth in claim 14, further comprising the step of rotating said plug until said optical fiber becomes substantially aligned with said optical port of said active optical device.

16. The method as set forth in claim 14, wherein said step of securing said sub-mount to said alignment block comprises the step of attaching said sub-mount to said alignment block with an adhesive.

17. The method as set forth in claim 14, wherein said step of inserting said plug into said sleeve comprises a step of separating said resilient member from said alignment block so that said plug can be received between said resilient member and said alignment block.

18. The method as set forth in claim 14, further comprising the steps of:

inserting a second plug into an opposite end of said sleeve as the first plug so that said second plug contacts said first and second reference surfaces and also contacts a second resilient member of said sleeve, said second resilient member biasing said second plug against said first and second reference surfaces; and sliding said second plug along said alignment block within said sleeve so that an end face of said second plug is adjacent said active optical device, a second optical fiber extending through a bore formed approximately along a central axis of said second plug.

\* \* \* \* \*